Feb. 20, 1962     G. D. ROBINSON, JR     3,021,982
COMPUTER-PRINTER INTERLOCK APPARATUS

Filed Dec. 23, 1959     4 Sheets-Sheet 1

INVENTOR.
GEORGE D. ROBINSON JR.
BY Chapin & Neal
ATTORNEYS

INVENTOR.
GEORGE D. ROBINSON JR.
BY Chapin & Neal
ATTORNEYS

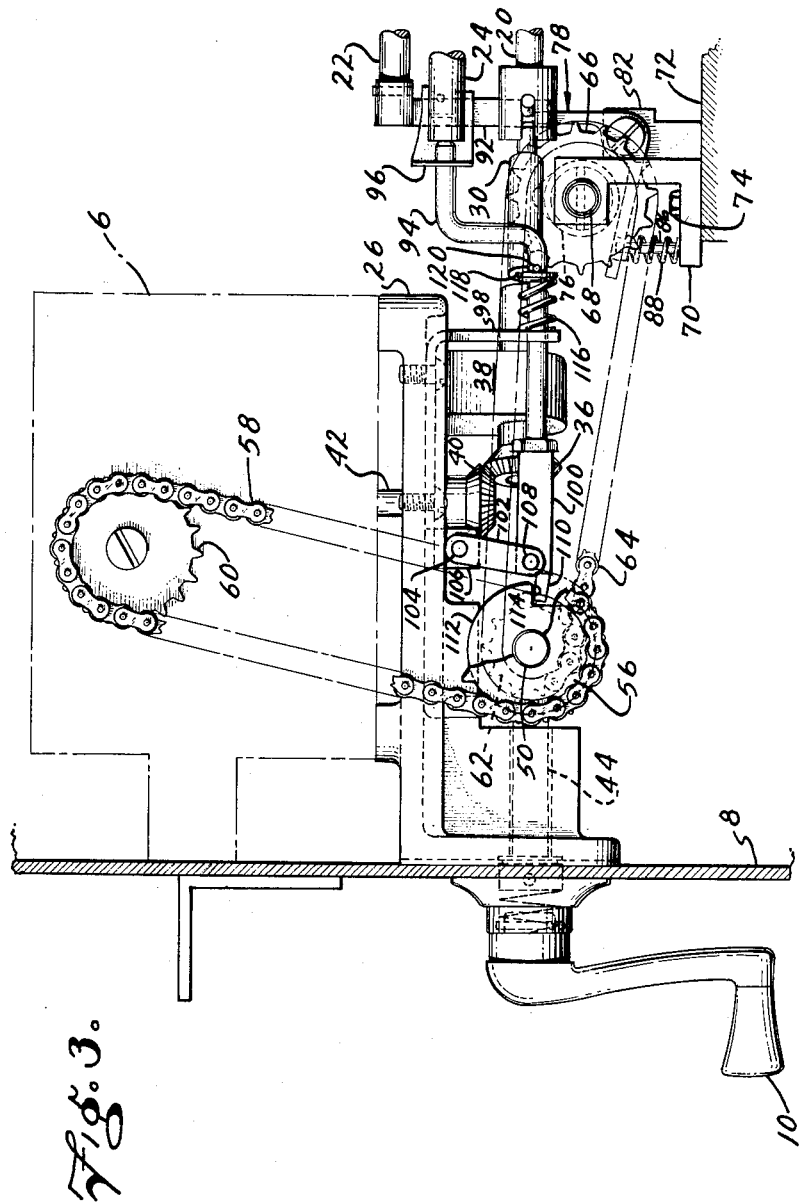

Feb. 20, 1962 G. D. ROBINSON, JR 3,021,982
COMPUTER-PRINTER INTERLOCK APPARATUS
Filed Dec. 23, 1959 4 Sheets-Sheet 4
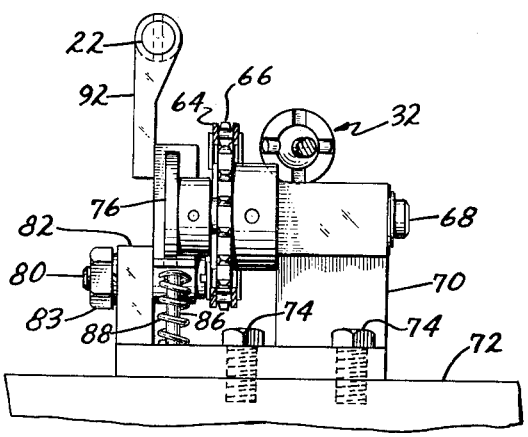
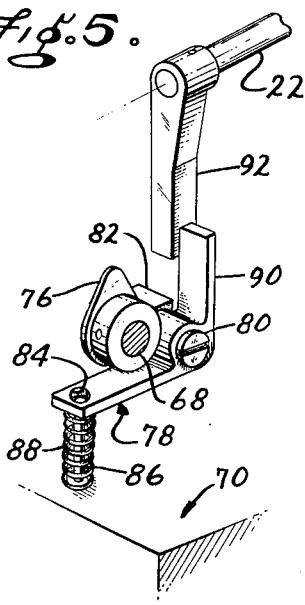
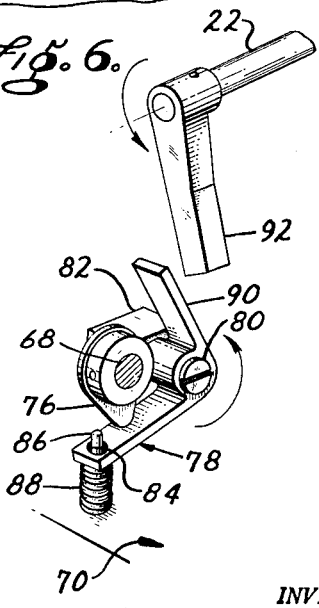
INVENTOR.
GEORGE D. ROBINSON JR.
BY Chapin & Neal
ATTORNEYS

United States Patent Office 3,021,982
Patented Feb. 20, 1962

3,021,982
COMPUTER-PRINTER INTERLOCK APPARATUS
George D. Robinson, Jr., Agawam, Mass., assignor to Gilbert & Barker Manufacturing Company, Springfield, Mass., a corporation of Massachusetts
Filed Dec. 23, 1959, Ser. No. 861,617
4 Claims. (Cl. 222—39)

This invention relates to liquid dispensing units such as are employed in the delivery of gasoline, and particularly to dispensing units which include a printing device for registering on a ticket or other receipt the total amount of gasoline dispensed in a given delivery.

The use of printing devices which are automatically driven by gasoline dispensing units is a fairly recent innovation. The printers are usually added to available dispensing units and consequently lack safeguards against printing incorrect totals. For the most part such printing devices are used for recording individual sales to customers on contract arrangements such as to trucking companies or other fleet owners. Such companies usually have an agreement with a supplier to pay a flat rate per gallon of gasoline delivered. A carrier company is therefore usually billed on a monthly or other periodic basis and accordingly desires some form of positive check on the exact amount of gas of gasoline delivered for its account to various employes over a billing period.

Fraudulent practices are possible where there is no positive means provided for insuring that the printer may be used solely to reflect the exact delivery made and no other amount. Where no such positive assurance is had, and insofar as is known existing equipment does not have such safeguards, an unscrupulous operator could imprint on a ticket a total of two or more consecutive deliveries on a single receipt or might, on other occasions, imprint less than the total amount of a single delivery. The possibility of falsification of delivery tickets may exist either when a dishonest station pump attendant is acting alone or where he may be acting in concert with an employee of the customer to whom an individual delivery is made.

An object of the invention is accordingly to provide a device capable of being used with presently available gasoline dispensing units and printers which prevents the attendant from imprinting on a ticket an incorrect total representing more than the amount of gasoline actually delivered to a purchaser.

Another object of the invention is to provide a device which will prevent the printing of a receipt for less gasoline than is dispensed in a given delivery. This protects the owner of the gasoline station against tickets showing amounts less than actually made to a customer.

A further object of this invention is to provide a device which will accomplish the above ends and still enable the dispensing unit to be freely operated in normal fashion such as in a sale to the more or less casual type of customer where no such ticket or receipt is desired; and when the printed ticket is desired to enforce on the attendant a correct sequence of operations to insure that only the true amount of delivery made is shown on the ticket.

The above and other objects and advantages of the invention will be apparent from the following description and with reference to the accompanying drawing in which:

FIG. 3 is a side elevation of the apparatus;

FIG. 4 is a section taken along line 4—4 of FIG. 2;

FIG. 5 is a perspective view of an interlock mechanism disposed in one operative position; and FIG. 6 is a perspective view of the interlock mechanism shown in FIG. 5, the parts thereof disposed in a different operative position.

Figure 1:
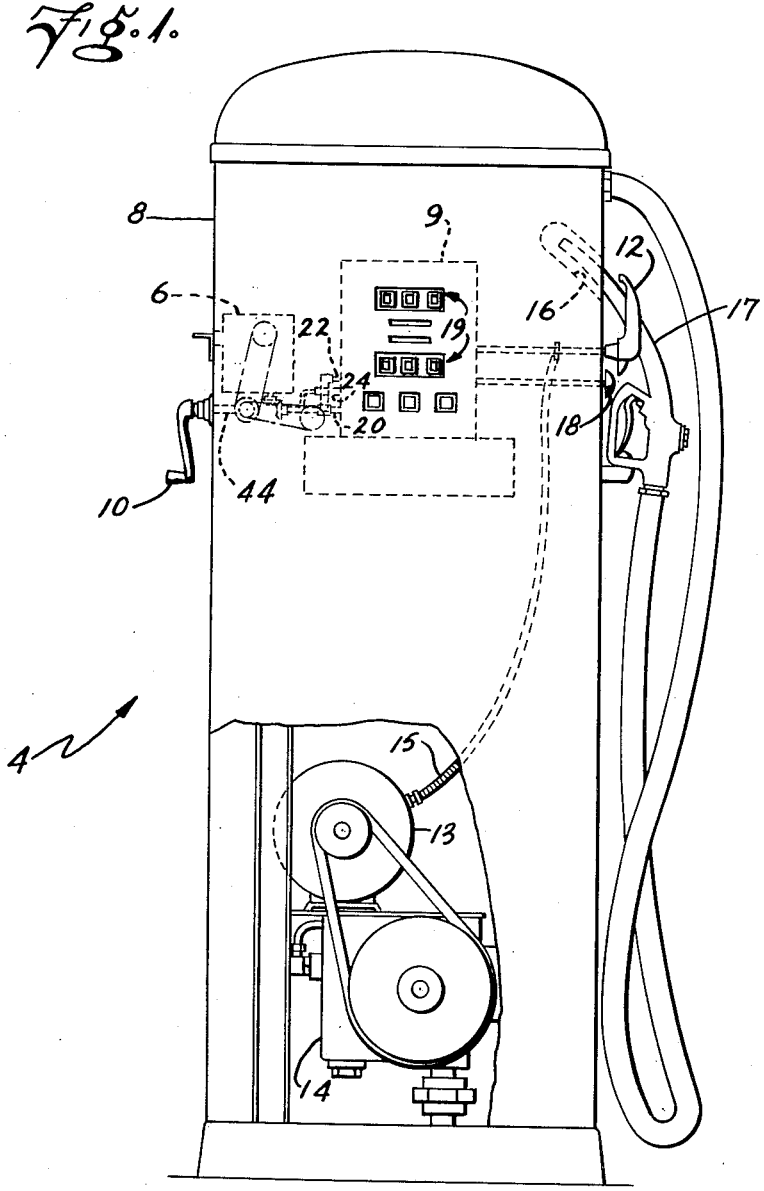
FIG. 1 is a front elevation of a gasoline dispensing unit which includes a computer, a ticket printer and apparatus which imposes a predetermined sequence of operation on the computer and printer.

Referring in detail to the drawings, and particularly FIG. 1, a gasoline dispensing apparatus is shown generally at 4. A printer 6 is mounted within and on the side of a gasoline pump housing 8 alongside a gasoline pump computer 9. The printer may be of any standard type such as is marketed by the Veeder Root Company, Hartford, Conn. under the tradename "Master Meter Duplicator" Series No. I–151000. It includes printing apparatus such as numeral wheels, not shown, for impressing or imprinting on a ticket or receipt the amount of gasoline delivered and registered on the gallon wheels of the computer 9. A handle 10 is mounted on one side of the pump housing for operating the printer 6.

The computer 9 may also be of a standard construction (preferably an automatic reset type) such as marketed by Veeder Root under the designation Model No. 56. A lever 12 for operating the computer 9 is located on the opposite side of the pump housing from the printer operating handle 10. The operating lever 12 is movable between upright and horizontal positions causing an electric motor 13 to be selectively energized and de-energized by means of a connector 15 such as a Bowden wire. The motor 13 drives pressurizing means such as the pump 14. Operating lever 12 extends outwardly of the side of the pump frame adjacent the nozzle receiving boot 16. The lever 12 is so located that it must be positioned upright before the nozzle 17 can be inserted in the boot. Movement of the operating lever 12 to its upright position causes the motor 13 to be de-energized. Thus it can be seen that the pump 14 must be shut off before the nozzle 17 can be returned to the boot 16. This is a well known type of construction which requires the motor to be shut off before the nozzle can be hung in its accustomed position.

The computer 9 also includes as standard equipment an interlock, not shown, which prevents the operating lever 12 from being moved to energize the motor 13 until the register wheels 19 of the computer have been set to zero; this is accomplished by movement of a reset knob 18. This type of interlock is also well known in the art.

Extending from the far side of the computer 9 opposite the operating lever and reset knob is a first shaft 20 which is an extension of the gallon wheels drive shaft and rotated proportional to the value registered on the computer gallon wheels 19. A second shaft 22 extends from the same side of the computer and is an extension of the shaft operated by the computer reset knob 18. A third shaft 24 extends from this side of the computer and is an extension of a shaft which is moved axially in response to the rotation of the computer operating lever 12.

Figure 2:
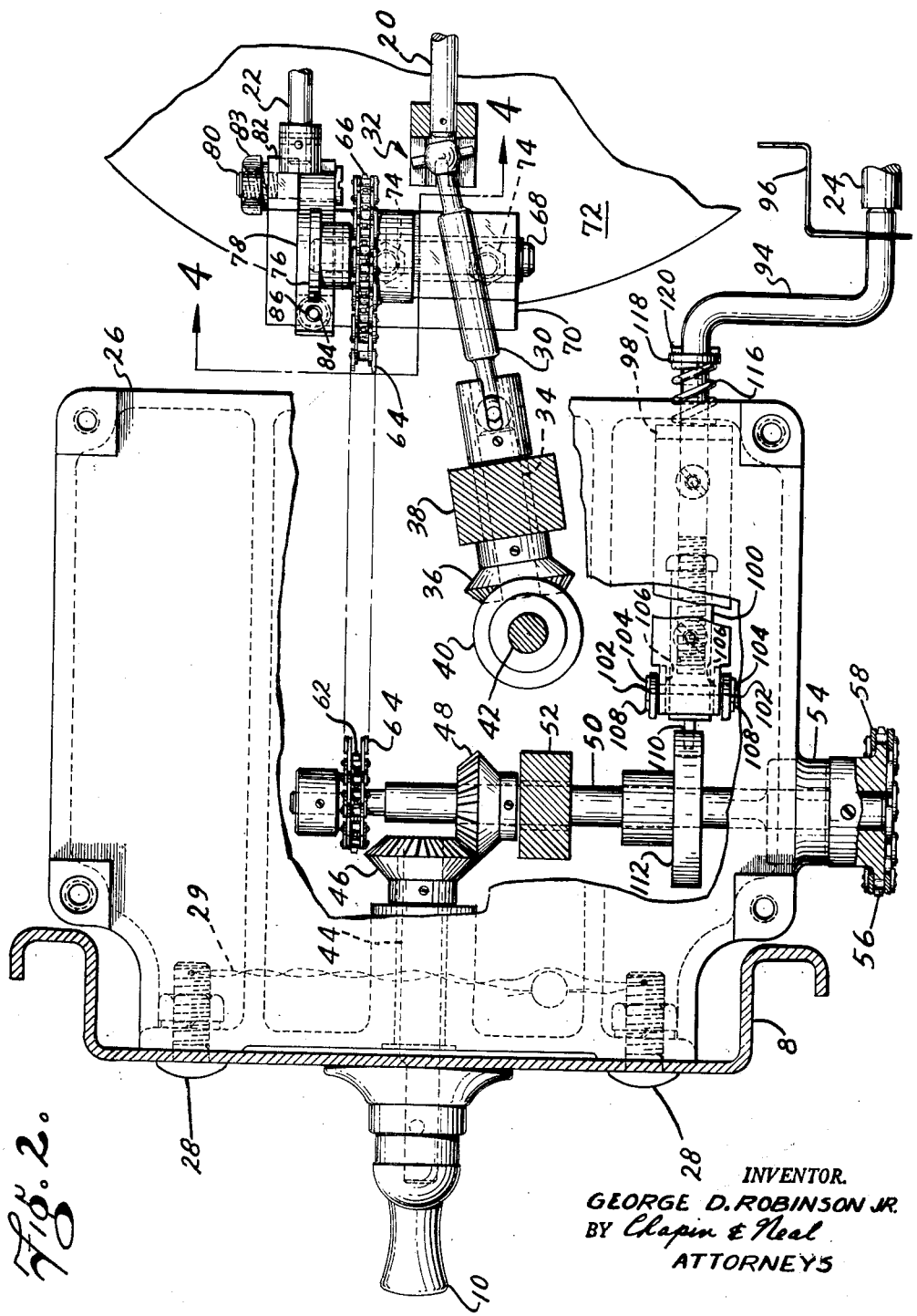
FIG. 2 is a plan view partly in section and on an enlarged scale of the apparatus embodying this invention.

Referring to FIGS. 2 and 3 the printer 6 is mounted on a support bracket 26 which is attached to the side of the pump frame 8 by means of mounting bolts 28. A sealing wire 29 is threaded through holes in the bolts 29 to prevent unauthorized tampering with the printer. The wheels of the printer 6 are driven to follow the totals registered on the wheels of the computer by means of a connecting shaft or link 30. One end of the link 30 is connected to the gallon wheel shaft 20 by a sliding universal coupling 32. The other end of the link 30 is similarly coupled to a shaft 34 on which a bevel gear 36 is mounted for rotation therewith. The shaft 34 is supported by a journal 38 which extends downwardly from the undersurface of the bracket 26. The bevel gear is in mesh with a similar bevel gear 40. A shaft 42 extends upwardly of the latter bevel gear and into the ticket printer 6 for driving the numeral wheels of the printer in conventional fashion. The printer is thus driven to follow the value registered on the wheels 19 of the computer so that when a given amount of liquid has been dispensed and registered on the computer wheels the printer is conditioned to imprint or stamp that amount on a ticket or receipt.

The printer operating handle 10 extends outwardly of the pump frame for actuating the printing wheels to stamp a ticket with the correct amount. The operating handle is drivingly connected to a shaft 44 on which a bevel gear 46 (FIG. 2) is carried. The bevel gear 46 is in mesh with a miter gear 48 which is pinned to a cross shaft 50. The cross shaft is journaled in a lug 52, which extends downwardly from the undersurface of the bracket 26, and also in a lug 54 which is formed on the side of the bracket 26. A sprocket 56 is mounted on the outer end of the cross shaft 50 and drives a chain 58 which is looped about another sprocket 60 (FIG. 3) extending outwardly of the side of the printer. Cranking the operating handle 10 causes rotation of the sprocket 60 which in turn moves the numeral wheels of the printer into contact with a ticket disposed within the printer. When a ticket is inserted into the printer, initial rotation of the operating handle prints a "zero" reading on the ticket and actuates a mechanism (not shown) which prevents withdrawal of the ticket from the printer until the operating handle has been again rotated (at which time the total will be printed).

On the end of the cross shaft 50 opposite the sprocket 56 is another sprocket 62 which is also rotated by the cross shaft. A chain 64 is driven by the latter sprocket and is drivingly engaged with a sprocket 66 mounted on a shaft 68. The shaft 68 is disposed parallel to the cross shaft 50 and is journaled in a bracket 70 which is secured to the upper surface 72 of the variator by means of a pair of screws 74. There is a 2:1 gear ratio between sprockets 62 and 66. Thus, the shaft 68 rotates ½ revolution for each complete revolution of the cross shaft 50, which is accomplished by one turn of the operating handle 10.

A cam 76 having a single projection or lobe is carried by the shaft 68. An L-shaped interlock lever 78 is pivotably mounted on a stud or bolt 80 which is supported by an upstanding block 82 and held in place by a nut 83. One leg of the lever 78 is generally horizontally disposed and includes an opening or hole 84 (FIG. 5) which receives the upper end portion of a pin 86. The pin 86 extends upwardly of the base portion of the bracket 70. A compression spring 88 is disposed around the pin 86 and yieldably urges the interlock lever against the peripheral surface of the cam 76. The interlock lever 78 also includes an upstanding arm portion 90 which is movable into and out of the path of rotation of a lever 92. The lever 92 is secured to the computer reset shaft 22 which is rotated by the reset knob 18 (FIG. 1). With the lobe of cam 76 disposed upwardly as shown in FIG. 5, the upstanding arm 90 of the interlock lever is disposed to prevent rotation of the computer reset shaft 22 and knob 18. Consequently, when the interlock lever is in this position, the computer cannot be reset and the dispensing pump cannot be started.

Because of the 2:1 gear ratio of the sprockets 62 and 66, rotation of the operating handle 10 through one revolution causes the cam 76 to be rotated ½ revolution. Such rotation would cause the interlock lever to be pivoted by the cam to the position shown in FIG. 6. The upstanding arm 90 is moved out of the path of rotation of the lever 92. Only when the interlock lever is disposed in this position can the computer reset knob 18 be operated to "zero" the wheels 19 of the computer.

The relationship of the cam, interlock lever 78 and reset lever 92 shown in FIG. 6 is the relative position of these parts when the ticket printer is not in use. Consequently, the gasoline dispensing apparatus may be freely operated in normal fashion without using the printer.

When it is desired to use the printer, a ticket is inserted into the printer and the operating handle 10 is rotated one revolution. A "zero" is printed on the ticket and the cam 76 is rotated so that its lobe extends upwardly as shown in FIG. 5 allowing the spring 88 to pivot the interlock lever 78 of the FIG. 5 position in which movement of the reset shaft 22 is prevented. Before another rotation of the operating handle 10, the computer reset knob 18 cannot be actuated and consequently another delivery of gasoline is prevented until the ticket has been printed, thus preventing a double entry on a single ticket.

After the desired quantity of gasoline has been delivered, the operator again cranks the printer operating handle 10 for a full revolution. This revolution of the operating handle does three things: it causes the total to be stamped on the ticket, "zeroes" the printer wheels, and pivots the interlock lever to the position shown in FIG. 6, which permits rotation of reset shaft 22 and enables resetting of the computer in a normal fashion. Thus, only after a ticket has been printed with a total and the printer "zeroed" can the computer be reset, and as stated above, the computer must be reset before a subsequent delivery can be made by the pump.

An additional interlock is provided to prevent the attendant or operator printing a total on a ticket for less gasoline than is dispensed to a customer. This interlock prevents rotation of the printer operating crank 10 after the pump has been energized by movement of the computer operating lever 12 until the pump has been shut off by the lever 12. The interlock is operated by the axially movable shaft 24 (FIGS. 1 and 2). When the operating lever 12 is rotated to start the pump, the shaft 24 is moved to the left by means within the computer (not shown); when the operating handle is moved to shut off the pump, the shaft 24 is moved to the right. Axial movement of the shaft 24 is related to operation of the computer wheels. A lever 94 is slidingly supported by a bracket 96 and another bracket 98 which is secured to the underside of the mounting bracket 26. One end of the lever is engaged with the outer end of the computer shaft 24, and the other end of the lever is threaded into a connector 100. A compression spring 116 is disposed around the lever 94; one end of the spring is seated against the outer surface of the depending portion of the bracket 98 and its other end is seated against a washer 118 which is held in place by a pin 120 extending through the lever arm. A pair of links 102 are pivotally mounted on a pin 104 which is supported by depending portions 106 of the bracket 98. The lower ends of the links 102 receive a pin 108 which also extends through a hole in the connector 100. The connector includes a latch finger 110 which extends outwardly of the lower portion of the end face of the connector. A locking cam 112 having a single step 114 is secured to the cross shaft 50 and rotates therewith.

The lever 94 is yieldingly urged to the right by the spring 116. In this position the latch finger 110 is positioned radially outward of the cam step 114. Consequently, the operating handle 10 of the printer may be freely rotated such as to "zero" the ticket in the printer. However, if the computer operating lever 12 is moved to start the pump 14 (FIG. 1) before "zeroing" the ticket, the printer operating crank cannot thereafter be used until the motor 13 is de-energized. When the dispensing pump is started by movement of the computer operating lever, the shaft 24 is moved to the left causing the spring 116 to be compressed. The latch finger 110 is moved into engagement with the step 114 of the locking cam 112. In this condition the operating handle of the printer cannot be rotated to print the total on the ticket until the motor 13 is de-energized by the lever 12. Rotation of the lever 12 in cutting off the motor 13 causes the shaft 24 to be moved to the right. The spring 116 causes the latch finger 110 to be moved out of engagement with the cam 102 and the printer operating handle 10 can be rotated to print a total on a ticket disposed in the printer 6.

*Operation*

The device disclosed herein enforces a predetermined sequence of operation on the operator or attendant. As a starting point, it will be assumed that the dispensing pump is off and the computer has not been reset from a previous delivery of gasoline. The initial relationship of the cam 76 and interlock lever 78 is as shown in FIG. 6. Before the dispensing pump can be started, the operator must actuate the computer reset mechanism to "zero" the computer wheels. If the printer is to be used, a ticket is inserted into the printer and a "zero" reading imprinted thereon by rotation of the operating handle 10. This will cause the cam 76 to rotate to its FIG. 5 position locking the computer reset shaft 22. At this point, it will be realized that the computer cannot be reset until the printer operating handle is again rotated as in printing a total on the ticket after completion of the delivery.

When the operator is ready to deliver gasoline, he rotates the computer operating lever 12 to start the dispensing pump. As heretofore described, the latch finger 110 is moved into engagement with the locking cam 112 and prevents rotation of the printer operating handle 10 until the computer operating lever is moved to cut off the pump 14. This feature, it will be recalled, prevents the operator printing a ticket for less gasoline than is delivered. During delivery of gasoline the printer is driven to follow the values registered by the computer. After delivery of gasoline, the attendant must then move the operating lever 12 to its "off" position in order to print a total on the ticket, and with a dispensing unit such as shown, to be able to return the nozzle to the boot 16. Rotation of lever 12 thus causes the latch finger 110 to be moved to free the locking cam 112 and enables the printer handle 10 to be rotated to imprint the total on the ticket and "zero" the printer. The attendant cannot reset the computer before printing the total because the interlock lever 78 would be disposed in its FIG. 5 position. This prevents the operator leaving a ticket in the printer and charging a later customer for more gasoline than he actually receives. Printing the total on a itcket by rotation of the operating handle thus returns the interlock lever to its initial or FIG. 6 position and enables the reset mechanism to be actuated for another cycle of operation.

It will also be realized by those skilled in the art that printers are also available similar to that above mentioned with the exception that no automatic reset ot zero is supplied for the printing wheels. Such printers are known as the cumulative type which will print a total gallons figure on initiating the above-described sequence of operations and at the end of the delivery will then print the cumulative total on the ticket. Accordingly, the exact delivery made will be figured by subtraction and a manual notation made. It will be seen, however, that with either type of printer the interlocking mechanism provided will assure the desired sequence of operations so that the attendant may not inadvertently or intentionally change such sequence to inaccurately reflect the actual delivery made to a customer.

Having thus described this invention, what is claimed is:

1. In a liquid dispensing apparatus having a computer for registering the amount of liquid delivered by said apparatus including a reset shaft movable to "zero" said computer after each delivery, a printer for imprinting said amount on a ticket or the like and driven by said computer, means for pressurizing said liquid, an operating lever movable between positions for selectively energizing and de-energizing said pressurizing means; a device for imposing a predetermined sequence of operation on said computer and printer comprising: a rotatable operating handle for actuating said printer to print "zero" on a ticket inserted therein and to print the total registered by said computer after delivery of liquid, an interlock responsive to first predetermined rotation of said handle for preventing movement of the computer reset shaft and to further predetermined rotation of said handle for permitting movement of said reset shaft, and means responsive to the position of said operating lever for preventing movement of the printer operating handle until said operating lever has been moved to de-energize said pressurizing means.

2. In a liquid dispensing apparatus having a computer for registering the amount of liquid delivered by said apparatus including a reset shaft movable to "zero" said computer after each delivery, a printer for imprinting said amount on a ticket or the like and driven by said computer, means for pressurizing said liquid for delivery from said apparatus, an operating lever movable between positions for selectively energizing and de-energizing said pressurizing means, said computer having a shaft movable axially in response to movement of said operating lever; the combination comprising: an operating handle rotatable through a first revolution for actuating said printer to print a "zero" value on said ticket when it is inserted in said printer, and rotatable through a second revolution to stamp the total registered by said computer after delivery of said liquid, an interlock lever mounted for movement to selectively lock and unlock said reset shaft, means yieldably urging said interlock to its locking position, a cam engageable with said interlock lever and responsive to the first revolution of said handle for moving said interlock lever to a position unlocking said computer reset shaft and to said second revolution and means for locking said operating handle until said operating lever has been moved to de-energize said pressurizing means, the operation of the handle locking means being controlled by said axially movable shaft.

3. In a liquid dispensing apparatus having a computer for registering the amount of liquid delivered by said apparatus including a reset shaft movable to cause said computer to be "zeroed" after each delivery, a printer for imprinting said amount on a ticket or the like and driven by said computer, means for pressurizing said liquid for delivery from said apparatus, an operating lever movable between positions for selectively energizing and de-energizing said pressurizing means, said computer having a shaft movable axially in response to movement of said operating lever; a control device for imposing a predetermined sequence of operation on said computer and printer comprising: an operating handle rotatable through a first revolution for actuating said printer to print a "zero" value on said ticket when it is inserted in said printer, and rotatable through a second revolution to print the total registered by said computer after delivery of said liquid, an arm mounted on and rotatable with said reset shaft, an interlock lever pivotally mounted for movement between a position engageable with the arm of said reset shaft for locking said shaft and to a position releasing said reset shaft, a spring urging said interlock lever into its locking position, a cam mounted for rotation at a speed equal to one-half the speed of rotation of said operating handle, said cam including a projection angularly disposed to engage and pivot said interlock lever to its releasing position when said operating handle is moved through said first revolution so that resetting said computer is provented until a total is printed on a ticket, said second revolution of the operating handle moving the cam projection out of engagement with said interlock lever whereby it is returned to its locking position by said spring, a second cam driven by said operating handle and including a step portion disposed in a predetermined angular relation to the operating position of said operating handle, a latch responsive to movement of said axially movable shaft for engaging said step to prevent the second revolution of the operating handle until the computer operating lever has been moved to de-energize said pressurizing means.

4. In combination with a liquid dispensing apparatus having computer means for registering the amount of liquid delivered, a reset shaft movable to "zero" said computer means, a movable handle for selectively energizing and de-energizing liquid for delivery in different positions of said handle, and means preventing operation of said energizing means prior to "zeroing" movement of said reset shaft; a printer, driven by the computer, for imprinting on a ticket or the like the amount of liquid delivered, a printer operating handle movable between a first and a second position, means responsive to movement of said operating handle from its first to its second position for printing a "zero" value on the ticket and responsive to movement from said second position to said first position for printing a "final" value on said ticket, characterized by interlock means drivingly connected to said printer handle, said interlock means being free and clear of said reset shaft and energizing handle and permitting normal operation of said shaft and handle in the first position of the printer handle and preventing movement of said reset shaft in the second position of said printer handle.

References Cited in the file of this patent
UNITED STATES PATENTS

| | | |
|---|---|---|
| 2,327,584 | Goldberg et al. | Aug. 24, 1943 |
| 2,354,249 | Eickmeyer et al. | July 25, 1944 |
| 2,935,229 | Robinson | May 3, 1960 |